United States Patent
Cornelissen

(10) Patent No.: US 9,371,406 B2
(45) Date of Patent: Jun. 21, 2016

(54) APPARATUS AND PROCESS FOR MAKING HIGH-PRESSURE POLYETHYLENE POLYMERS AND COPOLYMERS

(71) Applicant: ExxonMobil Chemical Patents Inc., Baytown, TX (US)

(72) Inventor: Philip H. Cornelissen, Heverlee (BE)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 14/420,805

(22) PCT Filed: Aug. 21, 2013

(86) PCT No.: PCT/US2013/055928
§ 371 (c)(1),
(2) Date: Feb. 10, 2015

(87) PCT Pub. No.: WO2014/046835
PCT Pub. Date: Mar. 27, 2014

(65) Prior Publication Data
US 2015/0203606 A1    Jul. 23, 2015

Related U.S. Application Data

(63) Continuation of application No. 61/704,601, filed on Sep. 24, 2012.

(30) Foreign Application Priority Data

Nov. 28, 2012 (EP) .................................... 12194571

(51) Int. Cl.
*C08F 10/02* (2006.01)
*C08F 2/01* (2006.01)
(Continued)

(52) U.S. Cl.
CPC ................ *C08F 10/02* (2013.01); *B01J 4/008* (2013.01); *B01J 19/02* (2013.01); *B01J 19/2415* (2013.01);
(Continued)

(58) Field of Classification Search
CPC ........ C08F 2/01; C08F 10/02; B01J 19/2415; B01J 19/244; B01J 2219/0277; B01J 2219/029
USPC ....................................... 526/62, 65; 422/134
See application file for complete search history.

(56) References Cited

U.S. PATENT DOCUMENTS 2,777,860 A * 1/1957 Egbert et al. ................... 549/257
2,941,012 A * 6/1960 Forshey, Jr. .................... 570/150
(Continued)

FOREIGN PATENT DOCUMENTS

EP     479186       4/1992
EP     2239283      10/2010

OTHER PUBLICATIONS

4130 Alloy Steels Material Property Data Sheet, Copyright 1999-2015, Metal Suppliers Online: http://www.suppliersonline.com/propertypages/4130.asp.*
(Continued)

*Primary Examiner* — Fred M Teskin
(74) *Attorney, Agent, or Firm* — Leandro Arechederra, III

(57) ABSTRACT

Embodiments of the invention provide an apparatus for the manufacture of polyethylene and polyethylene copolymers. The apparatus includes a primary compressor in fluid communication with a two-stage secondary compressor, the secondary compressor in fluid communication with a heated conduit in fluid communication with a tubular reactor, the tubular reactor including one or more reaction zones having a heating/cooling jacket, said reactor tube including an inner material and an outer material, said outer material being substantially inert in the presence of water under operating conditions, the tubular reactor in fluid communication with a product separator, and at least one conduit for the transfer of recycled ethylene from the product separator to the secondary compressor. Processes for manufacturing polyethylene and polyethylene copolymers using such an apparatus are also described.

22 Claims, 1 Drawing Sheet

(51) Int. Cl.
  *B01J 19/02* (2006.01)
  *B01J 19/24* (2006.01)
  *B01J 4/00* (2006.01)
  *C08F 2/34* (2006.01)

(52) U.S. Cl.
  CPC .......... *C08F 2/01* (2013.01); *B01J 2219/00094* (2013.01); *B01J 2219/029* (2013.01); *B01J 2219/0286* (2013.01); *B01J 2219/24* (2013.01)

(56) References Cited

U.S. PATENT DOCUMENTS 3,057,924 A * 10/1962 Eads et al. ............ 568/3
7,737,229 B2   6/2010 Gonioukh et al.
2007/0032614 A1 * 2/2007 Goossens et al. ............ 526/65

OTHER PUBLICATIONS

Advances in Polymer Science, vol. 7, pp. 386-448, (1970).

* cited by examiner

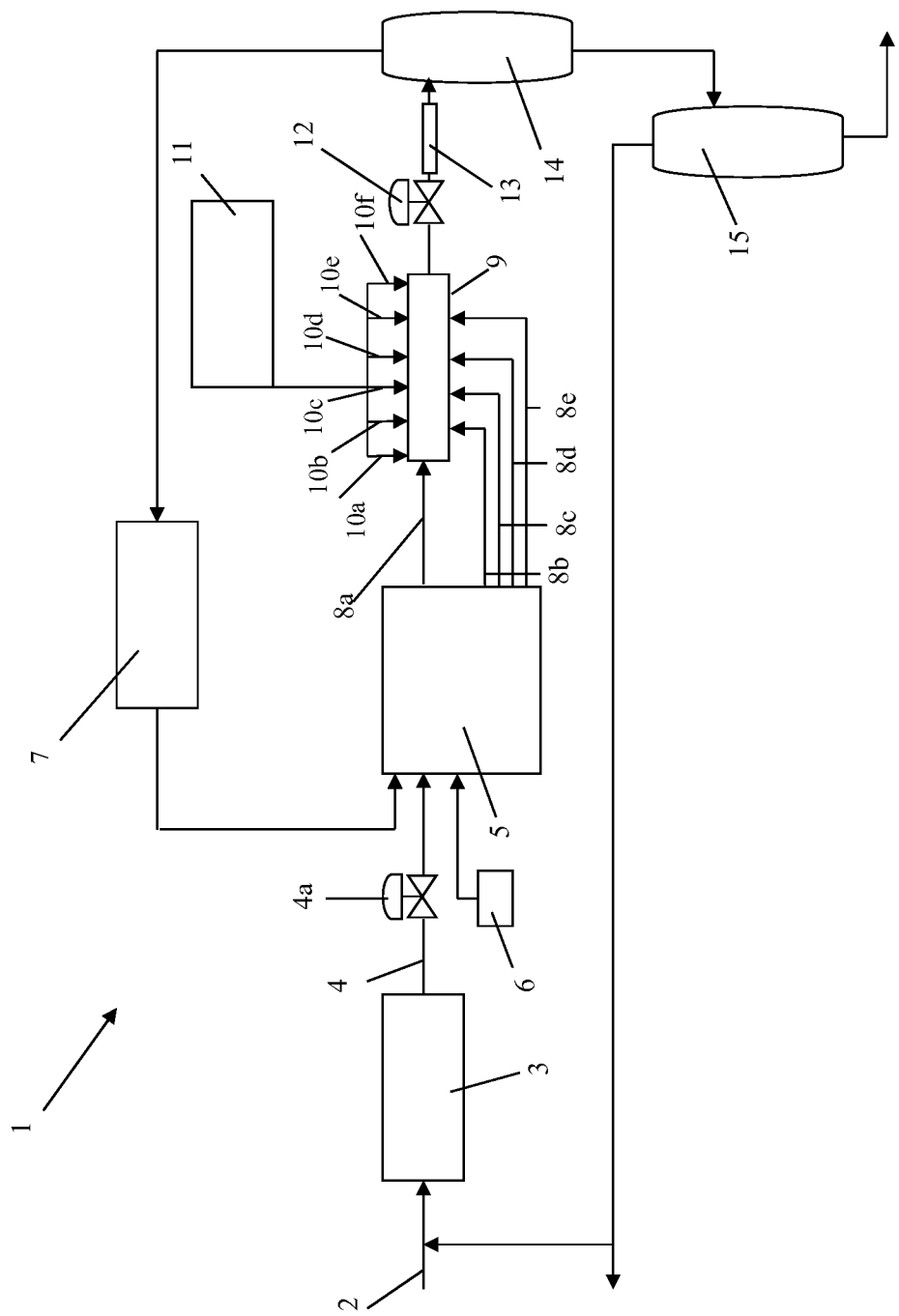

APPARATUS AND PROCESS FOR MAKING HIGH-PRESSURE POLYETHYLENE POLYMERS AND COPOLYMERS

PRIORITY CLAIM CROSS-REFERENCE TO RELATED APPLICATIONS

This application is a National Stage Application of International Application No. PCT/US2013/055928, filed Aug. 21, 2013, and claims the benefit of U.S. Ser. No. 61/704,601, filed Sep. 24, 2012, and EP 12194571.1, filed Nov. 28, 2012, the disclosures of which is are hereby incorporated by reference in their entireties.

FIELD OF THE INVENTION

Embodiments described herein generally relate to high-pressure polyethylene reactors and processes for making high-pressure polyethylene polymers and copolymers. More particularly, embodiments described herein relate to high-pressure polyethylene reactors and processes wherein the tubular reactor thereof comprises an inner material and an outer material, said outer material being substantially inert in the presence of water under operating conditions.

BACKGROUND OF THE INVENTION

Methods are well known in the art for using a tubular reactor to form low density ethylene-based polymers from ethylene, and optionally, one or more comonomers, such as low density polyethylene (LDPE). The overall process is a free-radical polymerization in a tubular reactor containing a process fluid, where the process fluid is partially comprised or ethylene and the ethylene is converted to an ethylene-based polymer in a highly exothermic reaction. The reaction occurs under high operating pressure (about 1000 bar to 4000 bar) in turbulent process fluid flow conditions at maximum temperatures of about 160° C. to about 360° C. The reaction initiation temperature, or the temperature in which the monomer (and optional comonomer) to polymer conversion is initiated (or in the case where there are multiple reaction points along the reaction tube, reinitiated), is from about 120° C. to about 240° C. Typical single-pass conversion values for a tubular reactor range from about 20 to about 40 percent.

The reaction is initiated (and reinitiated) by injecting an initiator into at least one reaction zone within the reactor tube. The initiator is mixed with the process fluid and, in the presence of heat (usually latent heat—the process fluid is typically already at an adequate reaction temperature), the initiator forms free-radical decomposition products. The decomposition products start a free-radical polymerization reaction with the ethylene (and optional comonomers) to form the product ethylene-based polymer.

The reaction generates significant heat in the reaction zones. Without proper cooling, the adiabatic temperature rise in the process fluid (which now contains ethylene-based polymer, i.e., product, that absorbs and retains heat) eventually results in unfavorable and possibly uncontrollable reactions. Such undesirable reactions may include ethylene decomposition (forming products such as carbon, methane, acetylene, and ethane), formation of high molecular weight polymer chains, and termination by combination and crosslinking, which may lead to a broadening of molecular weight distribution. The results of such undesirable reactions range from a variation in product quality and consistency issues, to reaction system shutdown, venting, and cleanup.

To reduce the level of undesirable reaction products, the tube reactor is generally jacketed such that water may be circulated to provide cooling to the reaction zones. Nevertheless, due to the demanding temperature and pressure conditions in the reactor, the cooling water can corrode the outer surface of the reactor tube, and may thereby reduce the lifetime of the reactor. Thus, it would be useful to provide a tubular reactor and process for making LDPE in a tubular reactor, in which the corrosion of the outer surface is reduced, thereby prolonging the life of the reactor.

SUMMARY OF THE INVENTION

In one aspect, embodiments of the invention provide an apparatus for the manufacture of polyethylene and polyethylene copolymers comprising a tubular reactor, the tubular reactor including one or more reaction zones having a heating/cooling jacket; the tubular reactor comprises an inner material and an outer material, said outer material being substantially inert in the presence of water under operating conditions. Preferred embodiments further include a primary compressor, optionally in fluid communication with a two-stage secondary compressor, wherein at least one of the primary and secondary compressors is in fluid communication with a heated conduit in fluid communication with the tubular reactor. In particular embodiments, the tubular reactor is in fluid communication with a product separator. Still further embodiments which include a primary and secondary compressor, further comprise at least one conduit for the transfer of recycled ethylene from the product separator to the secondary compressor.

In another aspect, embodiments of the invention provide a process for the manufacture of ethylene polymers and copolymers, comprising: introducing a heated monomer mixture comprising ethylene and optionally a comonomer into a tubular reactor having at least three reaction zones, each having a heating/cooling jacket. The tubular reactor comprises an inner material and an outer material, and the outer material is substantially inert in the presence of water under operating conditions.

In particular embodiments of such apparatuses and processes, the outer material comprises copper, particularly copper having a phosphorous content of 0.005 to 0.050 wt. %, preferably 0.01 to 0.030 wt. %, and more preferably 0.015 to 0.025 wt. %.

Embodiments of the invention provide an apparatus for the manufacture of polyethylene and polyethylene copolymers comprising a tubular reactor which includes one or more reaction zones having a heating/cooling jacket. The tubular reactor comprises an inner material and an outer material, and the outer material consists essentially of copper.

Embodiments of the invention also provide a process for the manufacture of ethylene polymers and copolymers comprising: introducing a heated monomer mixture comprising ethylene and optionally a comonomer into a tubular reactor having at least three reaction zones, each of which has a heating/cooling jacket. The tubular reactor comprises an inner material and an outer material, and the outer material consists essentially of copper.

BRIEF DESCRIPTION OF THE DRAWING

So that the recited features of the present invention can be understood in detail, a more particular description of the invention, briefly summarized above, may be had by reference to embodiments, some of which are illustrated in the appended drawing. It is to be noted, however, that the appended drawing illustrates only typical embodiments of this invention and is therefore not to be considered limiting of its scope, for the invention may admit to other equally effective embodiments.

The drawing schematically depicts an illustrative high pressure polymerization system suitable for producing a polyethylene polymer comprising copolymer according to one or more embodiments described.

DESCRIPTION OF EMBODIMENTS OF THE INVENTION

A production facility and process for the manufacture of polyethylene and polyethylene copolymers in a tubular reactor operating at high efficiency and reliability on a scale of greater than 300 ktpa by having a primary compressor that operates at a throughput of at least 55 tonnes/hr and a secondary compressor preferably having at least 14 cylinders and operating at a throughput of at least 120 tonnes/hr to compress the mixed ethylene to a pressure of at least 2300 bar is hereinafter discussed in detail.

The function of the primary compressor is to pressurize fresh ethylene (make-up ethylene) to the pressure of the ethylene recycle system, for feed to the secondary compressor. The primary compressor may be a single compressor that alone pressurizes the ethylene to the pressure of the recycle stream, or it may be two or more compressors in series or in parallel that, in combination, pressurize the fresh ethylene to the pressure of the ethylene recycle system. In some existing tubular ethylene reactor plants, the ethylene discharged from the primary compressor is divided into two streams, one stream being combined with recycled ethylene and fed to the suction of the secondary compressor, and the other stream being injected into the ethylene/polymer mixture downstream of the high-pressure let-down valve, thereby providing rapid cooling of the ethylene/polymer mixture prior to entry into the product separation unit. In the process of the invention, preferably substantially the entire output of the primary compressor is fed to the secondary compressor.

Make-up ethylene is typically supplied to tubular reactor facilities at pressures from about 15 bar to 90 bar. Regardless of the ethylene supply pressure, in the process of the invention the primary compressor should have an ethylene gas throughput of at least 55 tonnes/hr. Preferably, the primary compressor operates at a gas throughput in the range of from 60 tonnes/hr to 120 tonnes/hr, more preferably in the range of from 70 to 110 tonnes/hr and especially in the range of from 80 to 100 tonnes/hr. As well as fresh make-up ethylene, the primary compressor may also receive ethylene recycled from the low pressure end of the product separation unit and from the primary and secondary compressor leakage systems.

It is also preferable to direct a small fraction of one of the ethylene recycle streams to a purge stream to limit build-up of inert components in the reactor system. In principle, the proportion of the total reactor gas throughput which is sent to the purge stream is typically in the range of from below 1 to 15%.

The discharge pressure of the primary compressor is matched to the pressure of the high pressure ethylene recycle system and may be, for example, in the range of from 270 bar to 350 bar, and is preferably in the range of from 280 bar to 320 bar. Also, the ethylene is preferably cooled after exit from the primary compressor and prior to entry into the secondary compressor.

The precise design of the primary compressor is not critical. However, in a favored embodiment, the primary compressor is a reciprocating compressor having at least 8 cylinders, preferably between 8 and 12 cylinders.

The secondary compressor compresses the ethylene to a pressure of at least 2300 bar for supply to the tubular reactor. As discussed with regard to the primary compressor, the secondary compressor is preferably a unit driven by a single motor, but may alternatively comprise two or more compressors in series or in parallel driven by separate motors. Any configuration of compressors, including the configuration described in greater detail below, is intended to be within the scope of this disclosure as long as said configuration is adapted to compress the ethylene from the intermediate pressure (of the ethylene as it leaves the primary compressor) to the desired reactor pressure, 2300 bar to 3100 bar. The secondary compressor is mechanically complex and is subject to very high mechanical forces, but is nonetheless employed to operate at a high throughput reliably and safely over a lifetime which may be several decades. The successful design and operation of the secondary compressor improves the viability of the process. However, the mechanical demands on the secondary compressor, particularly the loads applied through the drive train, increase as the desired throughput increases.

Secondary compressors for use with tubular polymerization reactors are typically two-stage reciprocating compressors having for example, six or eight cylinders arranged in a compressor frame and having a common crankshaft driven by an electric motor standing at one end of the compressor frame. It is usually preferred to mount the compressor on foundations specially adapted to minimize vibration. In order to provide desired throughput, secondary compressors capable of moving large volumes of material through the system should be used. Larger volumes can be moved using larger cylinders, provided cylinder components such as plungers and connecting rods are suitable for such loads. Throughput may be increased by increasing the number of cylinders in a suitable cylinder frame. Another way to provide desired throughput is to add, where possible, a second compressor frame on the other side of the motor. Preferably, the desired throughput is obtained by using a two-stage reciprocating secondary compressor, preferably having at least fourteen (14) cylinders, preferably capable of compressing ethylene to a pressure of at least 2300 bar at a throughput of at least 120 tonnes/hr.

In one embodiment, the secondary compressor comprises a motor and a single compressor frame driven by the motor. In that embodiment, it is preferred that the cylinders be relatively large in order to achieve a relatively high throughput per cylinder. However, larger cylinders, whether the increase in size is due to an increase in stroke length or an increase in plunger diameter or a combination of the two, impose correspondingly greater loads on the drive train end and on the high pressure piping support and, therefore, it is preferred that the single compressor frame comprises no more than 16 cylinders, in order to restrict the length of the crankshaft. In that embodiment, the secondary compressor preferably operates at a speed of from 150 to 200 rpm.

In a preferred embodiment, the secondary compressor comprises a motor and two cylinder frames arranged on opposite sides of the motor. In this embodiment, the cylinders may be smaller than where a single frame is used for comparable throughput. In this embodiment, the secondary compressor preferably has 16, 18, 20, 22, or 24 cylinders, but may have up to 32 cylinders (16 on each cylinder frame). Advantageously, each cylinder frame may have no more than 12 cylinders. Advantageously, a first cylinder frame may have an equal number of cylinders as a second cylinder frame. The operating speed of the two-frame compressor is preferably within the range of from 180 to 250 rpm.

Where the secondary compressor has two cylinder frames it will, typically, be preferred to couple at least one of the cylinder frames to the motor via a flexible coupling. While it is within the scope of the invention for each of the two frames to be connected to the motor via a flexible coupling, it is preferred to have only one coupled with a flexible coupling. The other compressor frame may then be coupled to the motor via a rigid coupling noting that rigid couplings are less costly and more robust than flexible couplings. The flexible coupling may be of the type which includes two packs of metal membranes, each membrane being relatively thin (less than 2 mm thick, for example) and joined by an axially-disposed rigid metal member. One membrane pack may be connected to the driveshaft of the motor and the other connected to the crankshaft of the compressor frame such that the torque is transmitted through each of the membrane packs. Alignment of the crankshaft and driveshaft is accommodated by flexing of the membranes as they rotate. Or, alternatively, a flexible coupling may be employed.

Where the secondary compressor comprises two compressor frames, preferably one frame is dedicated to the first stage of compression and the other frame is dedicated to the second stage, thereby minimizing the complexity of the piping runs between stages. The piping in the vicinity of the secondary compressor, which has an operating speed in the range of from 150 rpm to 300 rpm and preferably from 180 rpm to 250 rpm, will be subject to significant vibration as well as high pressure, and should be constructed accordingly. Preferably, the piping from the first stage cylinders to the cooler (if present) and/or from the cooler (if present) to the second stage cylinders and/or from the first stage cylinders to the second stage cylinders has a diameter in the range of from 50 mm to 80 mm.

The gas throughput through the secondary compressor is preferably in the range of about 160 to 190 tonnes/hr, although higher throughputs may be desired at an especially large scale or for instances where for particular reasons it is desired to operate at a lower conversion, for example, because of constraints on the reactor pressure. In one embodiment, the throughput through the secondary compressor is in the range of from 140 to 210 tonnes/hr, more preferably from 170 to 210 tonnes/hr, and at a pressure in the range of from 2300 bar to 2750 bar.

The secondary compressor compresses the ethylene to a pressure of at least 2300 bar. In one embodiment, the pressure is in the range of from 2800 bar to 3100 bar, especially from 2900 bar to 3100 bar. While operation at pressures higher than 3100 bar is feasible, and might enhance conversion, operation at such high pressures has the disadvantages that the loads on the secondary compressor are increased and that the wall thickness of the tubular reactor should be increased, which increases cost and reduces the heat transfer capability across the wall thereby requiring an increase in the length of the tubular reactor in order to conduct away the heat of polymerization. The latter disadvantage is especially significant when operating at the scale of the process of the invention, and, accordingly, pressures below 3100 bar are preferred.

The temperature of the ethylene should be controlled to allow load balancing between the two compressor stages thereby optimizing/maximizing the compressor throughput. Typically, the ethylene is cooled between the first and the second stages of compression in the secondary compressor. That may be done by passing the ethylene through tubes provided with a cooling jacket, typically a water jacket.

The interstage pressure, that is, the pressure between the first and second stages of the secondary compressor will typically be in the range of 1100 bar to 1600 bar.

Upon leaving the secondary compressor, at least a portion of the ethylene passes to the front end of the tubular reactor.

In a preferred embodiment, the ethylene discharged from the secondary compressor is divided into more than one stream, one of which enters the front end of the tubular reactor and the other or others enter as sidestreams at points along the length of the tubular reactor. In a particularly preferred embodiment, the ethylene discharged from the secondary compressor is split into 4, 5, 6, or 7 streams, with one stream going to the front end of the tubular reactor and the others entering as sidestreams. The streams may be of unequal volume, thereby providing flexibility in tailoring of the volume of ethylene entering each reaction zone in the tubular reactor.

The ethylene which is introduced into the front end of the tubular reactor is heated to at least 95° C., preferably at least 135° C., or in some cases at least 160° C., in order to promote the decomposition of the initiator and start the polymerization reaction. The initiator is injected at three or more different points along the length of the tubular reactor, thereby defining at least three reaction zones.

Polymerization commences immediately downstream of the first reaction zone thereby causing the temperature of the reaction mixture to rise due to the exothermic nature of the polymerization. As the temperature rises, initiator decomposition and polymerization rates increase, accelerating the heat generation and causing the temperature to rise further. As initiator is consumed, initiation and polymerization slow and at the point where heat generation equals heat conducted away from the reaction mixture, the temperature peaks and then begins to fall.

Thus, as the reaction mixture travels along the length of the reactor, the temperature of the reaction mixture increases to a peak and then decreases until the next initiator injection point is reached, whereupon the process begins again. The zones downstream of initiator injection points in which the polymerization reaction occurs are known to those of skill in the art as reaction zones. The tubular reactor will generally be equipped with at least one temperature-regulated heating/cooling jacket in each reaction zone.

In embodiments of the invention, the tubular reactor is constructed from at least two materials such that the inside diameter of the tubular reactor in contact with the polymerization media is formed of an inner material and the outer diameter of the tubular reactor in contact with the water inside the heating/cooling jacket is formed of an outer material. Preferably, the inner material is a steel alloy having one or more of the following features: a carbon content $\leq 0.40$ wt. %, preferably $\leq 0.35$ wt. % (e.g., 0.05 to 0.35 wt. %, 0.10 to 0.30 wt. %, or 0.15 to 0.25 wt. %); a manganese content $\leq 0.90$ wt. % (e.g., 0.05 to 0.85 wt. %, 0.10 to 0.70 wt. %, or 0.20 to 0.50 wt. %); a phosphorus content $\leq 0.015$ wt. % (e.g., 0.005 to 0.015 wt. %, 0.075 to 0.0.15 wt. %, or 0.010 to 0.015 wt. %); a sulfur content $\leq 0.015$ wt. % (e.g., 0.005 to 0.015 wt. %, 0.075 to 0.0.15 wt. %, or 0.010 to 0.015 wt. %); a silicon content $\leq 0.35$ wt. % (e.g., 0.05 to 0.35 wt. %, 0.10 to 0.30 wt. %, or 0.15 to 0.25 wt. %); a nickel content of $\leq 5.0$ wt. % (e.g., 1.5 to 2.25 wt. %, 2.3 to 3.3 wt. %, or 3.3 to 4.5 wt. %); a chromium content of 0.80 to 2.00 wt. %; a molybdenum content of $\leq 0.80$ wt. % (e.g., 0.20 to 0.40 wt. %, 0.30 to 0.50 wt. %, or 0.40 to 0.80 wt. %); and/or a vanadium content $\leq 0.20$ wt. % (e.g., 0.01 to 0.20 wt. %, 0.05 to 0.15 wt. %, or 0.075 to 0.10 wt. %). Typically, the inner material comprises preferably a low-alloy carbon steel according to ASTM A723.

The outer material is selected to be substantially or essentially inert with respect to water over long periods of time. As used herein the term "essentially inert" means that less than 0.1 wt. % of the outer reactor tube surface is a corrosion product, as determined from corrosion measurements at 100 randomly selected points on the outer surface of the reactor. "Essentially inert" would exclude a surface exhibiting substantial pitting, for example, but would not exclude a surface exhibiting a thin layer of oxidation or patina. As used herein the term "substantially inert" means that the corrosion rate on a low-alloy carbon steel according to ASTM A723, i.e., a steel having a carbon content ≤0.40 wt. %, a manganese content ≤0.90 wt. %; a phosphorus content ≤0.015 wt. %; a sulfur content ≤0.015 wt. %; a silicon content ≤0.35 wt. %; a nickel content of 1.5 to 2.25 wt. %, a chromium content of 0.80 to 2.00 wt. %; a molybdenum content of 0.20 to 0.40 wt. %, and a vanadium content ≤0.20 wt. % is at least 20.0% (preferably 30.0%, 40.0%, 50.0%, 75.0%, 100.0%, 200.0%, 500.0%, or more) greater than the corrosion experienced by the outer material over the same time period, typically measured under conditions simulating a period of 20 years. Alternatively, should the definition of either of the terms "essentially inert" or "substantially inert" as defined above be considered unclear, either term shall mean "a copper or any material having a corrosion rate no more than 10% greater than that of copper or a copper having a thin surface layer of oxidation or patina". Alternatively, should the definition in the previous sentence be considered unclear or indefinite, either of the terms "essentially inert" or "substantially inert" shall mean "a copper," preferably of one of the types described herein or a mixture thereof, with or without a layer of oxidation product or patina thereupon.

Thus, typically, the outer material comprises copper. Suitable types of copper include oxygen-free electronic copper (C10100); oxygen-free copper without residual deoxidants (C10200); oxygen-free, extra low phosphorus copper (C10300); oxygen-free, low phosphorus copper (C10800); phosphorus deoxidized, low residual phosphorus copper (C12000); or phosphorus deoxidized, high residual phosphorus copper (C12200). Mixtures of such coppers may also be used. In particular embodiments the copper has a phosphorous content of 0.005 to 0.050 wt. %, preferably 0.01 to 0.030 wt. %, more preferably 0.015 to 0.025 wt. %.

The inner and outer materials can be formed by any suitable means. For example, in some embodiments, the inner material is provided as a low-alloy carbon steel tube over which the outer material, e.g., copper, is cold drawn. Methods for cold drawing materials such as copper over steel tubing are known in the art. Any method of applying the outer material over the inner material may be used provided it, as well as the inner and outer materials, are selected according to design parameters. One such method is generally referred to in the art as cladding, thus in a preferred embodiment the inner material reactor tubing comprises copper-cladded steel tubing. In such embodiments, it is preferred that intermediate tube supports (i.e., those supporting the jacket) should have a soft tip in the area where the copper cladding contacts the support in order to avoid damage to the copper.

Generally, although not necessarily, the inner material has a thickness, $T_i$, of about 10.0 to about 100.0 mm, preferably about 15.0 to about 50.0 mm, and the outer material has a thickness, $T_o$, of about 0.50 to about 10.0 mm, particularly 1.0 to about 5.0 mm. The ratio of the thickness of the inner material to the thickness of the outer material, $T_i:T_o$, is about 5:1 to about 50:1, preferably about 7.5:1 to about 35:1, or about 10.0:1 to about 30:1.

In the embodiment in which the ethylene discharge from the secondary compressor is split into two or more streams, with one stream entering the front end of the reactor and the other stream(s) entering as sidestream(s), the sidestream(s) typically enter(s) the reactor upstream of an initiator injection point, preferably after being cooled, for example, to between 10° C. and 20° C., before entry into the reactor in order to reduce the temperature of the reaction mixture. As mentioned above, the total conversion of monomer to polymer along the length of the reactor is, in practice, limited by the ability to cool the reaction mixture, and so cooling the sidestreams can allow an increase in conversion for a given reactor.

The peak temperature for each reaction zone will advantageously be in the range of from 200° C. to 350° C. Preferably, in at least one reaction zone the peak temperature will be in the 280° C. to 340° C., range, preferably from 290° C. to 315° C. The increase in temperature in a reaction zone is proportional to the amount of polymer made in that reactor zone, so operating at high peak temperatures favors high conversion. However, the kinetics of ethylene polymerization are such that as the temperature rises, chain transfer to polymer increases relative to propagation of linear chains and the polydispersity index increases, resulting in an increase in the haze value of the polymer produced. Accordingly, when it is desired to manufacture a low haze grade of polymer, lower peak operating temperatures are preferred. Preferably, in each reaction zone upstream of an initiator injection point (i.e., in all but the last reaction zone) the reaction mixture is cooled to at least 20° C., more preferably to at least 40° C., and most preferably to at least 50° C., below the peak temperature of that reaction zone before the reaction mixture reaches the next initiator injection point.

The cooling in any reaction zone may be by means of a cooling jacket or a combination of a cooling jacket and introduction of a sidestream of cooled ethylene.

In the process of polymerizing ethylene in a tubular reactor, once the desired throughput of ethylene through the secondary compressor and into the reactor is established, the pressure in the reactor is controlled by the high-pressure let-down valve, through which the product mixture exits the reactor. Opening the valve decreases pressure in the tubular reactor; closing the valve increases the pressure. Moreover, a pressure drop exists along the length of the tubular reactor which forces the reaction mixture along the reactor at a desired velocity (the term "reactor pressure" herein refers to the maximum pressure in the reactor, that is, the pressure immediately downstream of the secondary compressor, unless another meaning is obvious from the context). The velocity of the reaction mixture through the reactor is believed to be important to the effectiveness of the heat transfer out of the reactor. It is theorized that at low velocity, laminar flow and/or build-up of thicker layers of polymer on the inside of the reactor tubes inhibits heat transfer away from the reaction mixture.

However, the pressure drop over the length of the reactor is limited by the requirement that the pressure should not fall below the point at which phase separation for the reaction mixture occurs. The pressure drop for a given throughput can be reduced by increasing the internal diameter of the tubular reactor. However, increased tube diameter also makes effective cooling of the reactor mixture more difficult.

A further factor relating to reactor kinetics is that providing an increased number of reaction zones generally allows improved conversion of ethylene to polymer, thereby improving the economics of the process. However, increasing the number of reaction zones generally requires an increase in the length of the reactor, necessitating increased tube diameters to balance the consequent effects of pressure drop and reactor flow velocity.

Where a secondary compressor is employed, throughput through the secondary compressor of at least 120 tonnes/hr of ethylene at a pressure of at least 2300 bar may be achievable by providing a tubular reactor having a maximum internal diameter of at least 65 mm and a length of at least 1.5 km and introducing initiator at three or more separate locations to give at least three separate reaction zones and achieving a conversion of at least 28%. A pressure drop over the length of the tube reactor such as to maintain a flow velocity in the tubular reactor of at least 6 m/s is preferably maintained.

A simple test for measuring corrosion is the weight loss method according to ASTM D2688-11, incorporated herein by reference in its entirety. Rate of corrosion (R) (mm per year, mpy) can be calculated as $$R(mpy)=(K \times W)/(A \times T \times D)$$

where: K=a constant with the value $8.76 \times 10^4$; W=weight loss (g); D=density of the metal (g/cm$^3$); A=exposed area of the sample coupon (cm$^2$), and t=time (hrs).

The maximum internal diameter of the tubular reactor of the invention is at least 65 mm in order to keep the pressure drop over the length of the reactor to an acceptable level. In the embodiment in which a portion of the ethylene discharged from the secondary compressor enters the tubular reactor as sidestreams, it will be desirable for the reactor to have regions of differing internal diameter increasing in stages down the length of the reactor as sidestreams enter. For example, for a process having a secondary compressor throughput of around 160 tonnes/hr at 3000 bar, 20% of which enters the front end of the tubular reactor and the rest enters as sidestreams, the tubular reactor may initially have a diameter in the region of 35 mm to 40 mm, and at the entry point of the first sidestream the internal diameter will increase, the increase being dependent on the size of that sidestream, and so on until after the last sidestream, the final internal diameter is in the region of 75 mm to 80 mm.

The particular maximum internal diameter of a tubular reactor chosen for any process according to the invention will be dependent upon the throughput of the secondary compressor, on the output pressure from the secondary compressor and on the length of the tubular reactor employed, all of which relate to the pressure drop experienced over the length of the reactor. The tubular reactor preferably has a length in the 1500 m to 5000 m range, more preferably from 3000 m to 4500 m.

In one embodiment, the secondary compressor output pressure is relatively low, in the region of 2300 bar to 2700 bar, and at least 50%o of the output of the secondary compressor enters the tubular reactor as sidestreans which help to cool the reactor contents, thereby making possible a relatively short reactor (for example, having a length in the region of from 1500 m to 4000 m). At a secondary compressor throughput of more than 120 tonnes/hr, the reactor maximum internal diameter is at least 70 mm, and at throughputs above 150 tonnes/hr, the reactor maximum internal diameter is at least 80 mm, preferably in the range of from 80 mm to 90 mm.

In another embodiment, the output pressure from the secondary compressor is again in the range of from 2300 bar to 2700 bar, and the whole output enters the front end of the reactor with no sidestreams being employed. In that embodiment, the tubular reactor, optionally, has a length in the 3000 m to 5000 m range, in order to provide sufficient cooling via cooling jackets, and a larger tube diameter is desired. For example, for throughputs in excess of 120 tonnes/hr a tube maximum internal diameter of at least 75 mm and for throughputs in excess of 150 tonnes/hr, a tube maximum internal diameter of at least 85 mm and optionally, as much as 100 mm.

In a third embodiment, the output pressure of the secondary reactor is in the range of from 2900 bar to 3100 bar, and at least 50%, more preferably at least 70%, of the ethylene enters as sidestreams, the tubular reactor has a length in the 1500 m to 4000 m range. For a secondary compressor throughput in excess of 120 tonnes/hr, the tube maximum internal diameter is at least 65 mm and for throughputs above 150 tonnes/hr the tube maximum internal diameter is at least 70 mm, for example between 70 mm and 80 mm.

In the process of the invention, polymerization in the tubular reactor is carried out in at least three reaction zones, each reaction zone commencing at an initiator injection point. In each reaction zone, ethylene is converted to polymer, therefore, having a larger number of reaction zones will generally increase conversion. However, each reaction zone will typically necessitate increasing the length of the tubular reactor, therefore increasing the pressure drop across the reactor. Preferably, the initiator is injected at 4, 5, or 6 different points along the tubular reactor thereby giving rise to 4, 5, or 6 reaction zones.

In some embodiments of the invention, the pressure drop over the length of the tube reactor is maintained at a level such as to maintain a flow velocity of the reaction mixture in the tubular reactor of at least 6 m/s. It has been found that the flow velocity influences the efficiency of cooling of the reaction mixture by heat transfer through the reactor tube walls, and that the heat transfer is particularly poor at low flow velocities. The actual minimum flow velocity which is desirable depends on the temperature of the cooling jacket. Where the cooling jacket contains fluid at a temperature below 50° C., and particularly below 30° C., such as water which is maintained at low temperature by cooling means, such as a cooling tower, then the flow velocity will preferably be at least 14 m/s in order to inhibit formation of a solid polymer layer on the inside of the tubular reactor which itself further inhibits heat transfer. In addition it may be preferred to allow the temperature of the cooling jacket in a particular reaction zone to rise periodically, in order to disperse any polymer layer which has formed). Accordingly, the flow velocity may be in excess of 14 m/s and is advantageously significantly higher, for example, in the range of from 14 m/s to 20 m/s.

Alternatively, factors arising from the design of a particular facility may make it desirable for the fluid in the cooling jacket to be at a temperature substantially above 50° C., for example, where it is desired to produce steam from the cooling water, in which case the temperature of the jacket will be in excess of 100° C. At such temperatures, the formation of polymer layers in the reactor tubes is unlikely to occur, and it is therefore feasible to operate the process with a flow velocity as low as 6 m/s. Preferentially, the flow velocity may be in the range of from 8 m/s to 14 m/s.

The proportion of the total ethylene which enters the tubular reactor, whether in the front end stream or as a sidestream, which is convened to polymer before exiting die reactor is referred to as the conversion. In the process of the invention, the conversion is at least 28%. Conversions of higher than 40% are feasible, but are not preferred, partly because the viscosity of the reaction mixture increases with its polymer content, which leads in turn to an increase in the pressure drop used to maintain a suitable flow velocity.

The conversion achieved is in part related to the pressure at which the reactor operates, with a higher front end pressure both increasing the rate of polymerization and making possible a greater pressure drop over the length of the reactor. However, operating at higher pressures imposes more strain upon the secondary compressor and also increases the energy consumption with a consequent cost disadvantage. For such reasons, it may be desirable in some instances to operate at a pressure of from 2300 bar to 2800 bar at a relatively low conversion, which may be, for example, approximately in the region of from 28% to 32%. Alternatively, it may be desirable to operate at a pressure in the region of 2800 bar to 3100 bar at a high conversion, for example, in the range of from 32% to 37%. However, pressure is only one of the factors which influence conversion and overall a conversion in the region of from 30% to 40% is preferred, with a more preferred range being from 30% to 37%.

As mentioned above, the reactor pressure is controlled by operation of a high-pressure let-down valve which is located at the downstream end of the tubular reactor. While the flow exiting from the reactor could be divided into more than one stream with each stream passing through a respective high-pressure let-down valve, in practice, it is preferred for there to be only one such valve, and for the entire output of the reactor to pass through it.

In a number of existing tubular reactor facilities, part of the ethylene discharge from the primary compressor is cooled and diverted in a separate stream to a location immediately downstream of the high-pressure let-down valve (ethylene quench), to act as a rapid quench cooling of the product mixture. Preferably, however, all of the ethylene discharged from the primary compressor is conducted into the secondary compressor and subsequently into the tubular reactor, in order to maximize the amount of polymer produced and alternative means are provided for cooling the product mixture.

The combination of high throughput and the factors mentioned above relating to pressure drop over the length of the reactor make it undesirable to provide more cooling capacity in the last reaction zone than is necessary to control the polymerization exotherm in the last reaction zone. Preferably, the temperature of the product mixture at the high-pressure let-down valve is in the range of from 260° C. to 290° C. Accordingly, downstream of the high-pressure let-down valve and upstream of the product separator, further cooling means is provided. As mentioned above, an ethylene quench is not preferred. Instead, a preferred form of cooling means is a product cooler comprising a conduit having a cooling jacket. The product cooler typically has a length in the range of from 200 m to 500 m, preferably from 300 m to 450 m. As the pressure downstream of the high-pressure let-down valve is much lower than inside the reactor, the walls of the product cooler may be thinner than the walls of the reactor tubes, thereby improving heat transfer. However, the depressurization causes phase separation of the product mixture and therefore the dimensions of the product cooler should be such as to maintain a flow velocity such that the polymer remains dispersed in de flow and does not adhere to the walls. An especially suitable form of product cooler has an internal diameter of at least 60 mm and a length of at least 200 m. A higher product velocity in the product cooler also improves heat transfer. Preferably, the product cooler reduces the temperature of the product mixture to the 170° C. to 280° C. range, preferably 220° C. to 260° C., more preferably from 230° C. to 250° C. In the product cooler, immediately upstream of the first stage of the product separation unit, the pressure is preferably in the range of from 200 bar to 350 bar.

From the product cooler the product mixture will typically flow directly into the first stage of the product separation unit.

The product separation of the process of the invention may be carried out in a single stage. However, two stage separation is generally preferred. In the first stage, known as the high pressure separator, the first separation of polymer from unreacted ethylene is carried out. The separated gas is fed to the high pressure recycle system for return to the secondary compressor. The molten polymer in the bottom of the high pressure separator is decompressed into a second stage, known as a low pressure separator, and almost all of the remaining ethylene is separated from the polymer and is sent to the purge gas compression system. Preferably, the pressure in the high pressure separator is in the range of from 200 bar to 350 bar. Preferably, the pressure in the last stage of the product separator is in the range of from 1 bar to 10 bar, more preferably from 1 bar to 3 bar.

The polymer melt from the final stage of the product separator will typically be fed to one or more hot melt extruders, for combination with additives, extruding and pelletizing, as is conventional.

The invention also provides a production plant or apparatus for the manufacture of polyethylene and polyethylene copolymers comprising a primary compressor capable of a throughput of at least 55 tonnes/hr arranged to supply compressed ethylene to a two-stage reciprocating secondary compressor having at least 14 cylinders and being capable of compressing ethylene at a throughput of at least 120 tonnes/hr at a pressure of at least 2300 bar, the secondary compressor communicating, via a conduit provided with heating means to enable at least a portion of the compressed ethylene to be heated to at least 95° C., with the front end of a tubular reactor, the secondary compressor optionally communicating via one or more further conduits with one or more points downstream of the front end of the tubular reactor for the supply of one or more ethylene sidestreams to the tubular reactor. The tubular reactor has at least three inlets for the injection of initiator thereby defining at least three reaction zones and being provided with a heating/cooling jacket in each reaction zone, the tubular reactor having a maximum internal diameter of at least 65 mm and being provided with a high-pressure let-down valve. The production plant further comprises, a cooling means arranged downstream of the high-pressure let-down valve, a product separation unit, preferably having at least two stages, and at least one conduit for the transfer of recycled ethylene from the product separation unit to the secondary compressor.

Copolymerization

As well as ethylene homopolymers, the process of the invention may be used for the manufacture of ethylene copolymers such as ethylene-vinyl acetate copolymers. Typically, the comonomer(s) will be pressurized and injected into the secondary compressor at one or more points. Other possible comonomer(s) include propylene, 1-butene, iso-butene, 1-hexene, 1-octene, other lower alpha-olefins, methacrylic acid, methyl acrylate, acrylic acid, ethyl acrylate and n-butyl acrylate. Reference herein to "ethylene" should be understood to include ethylene and comonomer mixtures, except where another meaning is implied by context.

Modifier

The process of the invention will often involve the use of a modifier to control the molecular weight of the product polymer by promoting chain transfer. Examples of chain transfer agents include tetramethylsilane, cyclopropane, sulfur hexafluoride, methane, t-butanol, perfluoropropane, deuterobenzene, ethane, ethylene oxide, 2,2-dimethylpropane, benzene, dimethyl sulfoxide, vinyl methyl ether, methanol, propane, 2-methyl-3-buten-2-ol, methyl acetate, t-butyl acetate, methyl formate, ethyl acetate, butane, triphenylphosphine, methylamine, methyl benzoate, ethyl benzoate, N,N-diisopropylacetamide, 2,2,4-trimethylpentane, n-hexane, isobutane, dimethoxymethane, ethanol, n-heptane, n-butyl acetate, cyclohexane, methylcyclohexane, 1,2-dichloroethane, acetonitrile, N-ethylacetamide, propylene, n-decane, N,N-diethylacetamide, cyclopentane, acetic anhydride, n-tridecane, n-butyl benzoate, isopropanol, toluene, hydrogen, acetone, 4,4-dimethylpentene-1, trimethylamine, N,N-dimethylacetamide, isobutylene, n-butyl isocyanate, methyl butyrate, n-butylamine, N,N-dimethylformamide, diethyl sulfide, diisobutylene, tetrahydrofuran, 4-methlylpentene-1, p-xylene, p-dioxane, trimethylamine, butene-2, 1-bromo-2-chlorethane, octene-1, 2-methytbutene-2, cumene, butene-1, methyl vinyl sulfide, n-butyronitrile, 2-methylbutene-1, ethylbenzene, n-hexadecene, 2-butanone, n-butyl isothiocyanate, methyl 3-cyanopropionate, tri-n-butylamine, 3-methyl-2-butanone, isobutyronitrile, di-n-butylamine, methyl chloroacetate, 3-methylbutene-1, 1,2-dibromoethane, dimethylamine, benzaldehyde, chloroform, 2-ethylhexene-1, propionaldehyde, 1,4 dichlorobutene-2, tri-n-butylphosphine, dimethylphosphine, methyl cyanoacetate, carbon tetrachloride, bromotrichloromethane, di-n-butylphosphine, acetaldehyde, and phosphine.

For further details of transfer agents, see Advances In Polymer Science, Vol. 7, pp. 386-448, (1970). Table 7 therein ranks several transfer agents in order of the chain transfer constant determined under set conditions. The tendency to copolymerize is indicated by the reactivity, also determined under set conditions.

The modifier can be added into the reaction mixture in any suitable way. For example, the modifier may be injected into the inlet pipes feeding one or more of the secondary compressor first stage cylinders. The modifier is, in general, not fully consumed during one pass through the reactor and is generally also present in the recycle ethylene returning to the secondary compressor.

Initiators

Initiators are used to initiate the free radical ethylene polymerization and many suitable initiators will be known to the skilled person. Organic peroxide initiators are preferred. Typically, a blend of several initiators having different half-life temperatures will be used in order to achieve the desired reaction kinetics. Some such methods of using initiators with different half-lives are described in European Patent No. 2239283 B1, and U.S. Pat. No. 7,737,229.

The pure peroxides are mixed, typically in a hydrocarbon solvent, and are then injected into the tubular reactor at the initiator injection locations. Any suitable pump may be used, for example, a hydraulically driven piston pump.

The present invention may be better understood with reference to the drawing.

The drawing is a schematic of a polymerization plant 1 including an ethylene feed line 2 which supplies fresh ethylene to a primary compressor 3. The ethylene discharged from the primary compressor 3 flows via conduit 4 having a valve 4a to the secondary compressor 5. Also entering the secondary compressor 5 is a stream of fresh modifier(s) and/or optional comonomer(s) and a stream of recycled ethylene. The fresh modifier stream is supplied by a separate modifier pump 6. The recycled ethylene comes from the high pressure recycle system 7.

The secondary compressor 5 is described in more detail below. The secondary compressor 5 discharges compressed ethylene in five streams 8a, 8b, 8c, 8d, and 8e. Stream 8a accounts for 20% of the total ethylene flow. Stream 8a is heated by a steam jacket (not shown) which heats the ethylene, prior to entry into the front end of the tubular reactor 9. The four remaining ethylene side streams 8b, 8c, 8d, and 8e each enter the reactor as sidestreams. Sidestreams 8b, 8c, 8d, and 8e are cooled. The tubular reactor 9 is also shown with six initiator inlets 10a to 10f which are spaced at intervals along reactor 9 and are fed from an initiator mixing and pumping station 11. The first initiator injection point 10a is just downstream of the front end of the reactor 9 and defines the start of the first reaction zone. Initiator entering through that first initiator inlet 10a combines with the hot ethylene from stream 8a and polymerization begins, raising the temperature of the ethylene as it travels down tubular reactor 9. A heating/cooling jacket (not shown) fitted on reactor 9 cools the reaction mixture and the temperature of the reaction mixture peaks at between 200° C. to 350° C., as initiator is consumed and the rate of polymerization begins to fall, and then begins to decline. Entry of the first sidestream 8b cools the reaction mixture further. The second initiator injection inlet 10b is just downstream of the entry point of sidestream 8b and defines the start of the second reaction zone. Once again, the temperature of the reaction mixture rises, peaks and falls as it flows along the tubular reactor 9 with the entry of the second sidestream 8c providing a further rapid cooling prior to entry of initiator at the third initiator inlet 10c, which defines the start of the third reaction zone. The third, fourth, fifth, and sixth reaction zones are similar to the second reaction zone except that the sidestreams are optional with regard to the fifth and sixth reaction zones, and therefore the distance between the fifth and sixth initiator inlets 10e and 10f may be relatively long, in order to allow for a greater length of heating/cooling jacket.

Downstream of the sixth initiator inlet 10f and the sixth reaction zone, the tubular reactor terminates in a high-pressure let-down valve 12.

In the region upstream of the injection point of the first sidestream 8b, the tubular reactor 9 has an initial internal diameter, which increases downstream of sidestream 8b, and increases further downstream of each subsequent sidestream until a maximum internal diameter of at least 65 mm, and preferably at least 70 mm is reached in the region downstream of the final sidestream 8e. That internal diameter profile allows the flow rate throughout the tubular reactor above 14 m/sec during normal operation under a secondary compressor throughput of 160 tonnes/hr and at an acceptable pressure drop across the reactor.

The high-pressure let-down valve 12 controls the pressure in the tubular reactor 9. Immediately downstream of the high-pressure let-down valve 12 is a product cooler 13. Upon entry to the product cooler 13, the reaction mixture is in a phase separated state. It exits into high pressure separator 14. The overhead gas from the high pressure separator 14 flows into the high pressure recycle system 7 where the unreacted ethylene is cooled and returned to the secondary compressor 5.

The polymer product flows from the bottom of the high pressure separator 14 into the low pressure separator 15, separating almost all of the remaining ethylene from the polymer. That remaining ethylene is transferred either to a flare (not shown) or a purification unit (not shown) or is recycled via the primary compressor 3 from the product separation unit to the secondary compressor. Molten polymer flows from the bottom of the low pressure separator 15 to an extruder (not shown) for extrusion, cooling and pelletizing.

With respect to the various ranges set forth herein, any upper limit recited may, of course, be combined with any lower limit for selected sub-ranges.

PARTICULAR EMBODIMENTS

Embodiment A

An apparatus for the manufacture of polyethylene and polyethylene copolymers comprising a tubular reactor, the tubular reactor including one or more reaction zones having a heating/cooling jacket, said reactor tube comprising an inner material and an outer material, said outer material being substantially inert in the presence of water under operating conditions.

Embodiment B

An apparatus for the manufacture of polyethylene and polyethylene copolymers comprising a tubular reactor, the tubular reactor including one or more reaction zones having a heating/cooling jacket, said reactor tube comprising an inner material and an outer material, said outer material consisting essentially of copper.

Embodiment C

The apparatus of Embodiment A or B, further including a primary compressor, optionally in fluid communication with a two-stage secondary compressor, wherein at least one of the primary and secondary compressors is in fluid communication a heated conduit in fluid communication with the tubular reactor.

Embodiment D

The apparatus of any of Embodiments A to C, wherein the tubular reactor in fluid communication with a product separator.

Embodiment E

The apparatus of any of Embodiments A to D, further comprising at least one conduit for the transfer of recycled ethylene from the product separator to the secondary compressor.

Embodiment F

The apparatus of any of Embodiments A to E, wherein the outer material comprises copper, particularly wherein the copper comprises oxygen-free electronic copper (C10100); oxygen-free copper without residual deoxidants (C10200); oxygen-free, extra low phosphorus copper (C10300); oxygen-free, low phosphorus copper (C10800); phosphorus deoxidized, low residual phosphorus copper (C12000); or phosphorus deoxidized, high residual phosphorus copper (C12200).

Embodiment G

The apparatus of any of Embodiments A to F, wherein the copper is a phosphorus deoxidized, high residual phosphorus copper (C12200), particularly having a phosphorous content of 0.005 to 0.050 wt. %, preferably 0.01 to 0.030 wt. %, more preferably 0.015 to 0.025 wt. %.

Embodiment H

The apparatus of any of Embodiments A to G, wherein the inner material comprises steel, preferably low-alloy carbon steel according to ASTM A723.

Embodiment I

The apparatus of any of Embodiments A to H, wherein the inner material is a steel having one or more of the following features: a carbon content ≤0.40 wt. %, preferably ≤0.35 wt. %; a manganese content ≤0.90 wt. %; a phosphorus content ≤0.015 wt. %; a sulfur content ≤0.015 wt. %; a silicon content ≤0.35 wt. %; a nickel content of 1.5 to 2.25 wt. %, 2.3 to 3.3 wt. %, or 3.3 to 4.5 wt. %; a chromium content of 0.80 to 2.00 wt. %; a molybdenum content of 0.20 to 0.40 wt. %, 0.30 to 0.50 wt. %, or 0.40 to 0.80 wt. %; and/or a vanadium content ≤0.20 wt. %.

Embodiment J

The apparatus of any of Embodiments A to I, wherein ratio of the thickness of the inner material, $T_i$, to the thickness of the outer material, $T_o$, is about 5.0:1 to about 50.0:1, preferably about 7.5:1 to about 35.0:1, or about 10.0:1 to about 30.0:1.

Embodiment K

The apparatus of any of Embodiments A to J, wherein the inner material has a thickness of about 10.0 mm to about 100.0 mm, preferably about 15.0 mm to about 50.0 mm, and the outer material has a thickness of about 0.50 mm to about 10.0 mm, particularly 1.0 mm to about 5.0 mm.

Embodiment L

The apparatus of any of Embodiments A to K, wherein the heated conduit includes heating means to enable at least a portion of the compressed ethylene to be heated to at least 95° C.

Embodiment M

The apparatus of any of Embodiments A to L, wherein the secondary compressor communicates via one or more further conduits with one or more points downstream of the front end of the tubular reactor for the supply of one or more ethylene sidestreams to the tubular reactor.

Embodiment N

The apparatus of any of Embodiments A to M, wherein the tubular reactor comprises at least three inlets for the injection of initiator thereby defining at least three reaction zones and being provided with a heating/cooling jacket in each reaction zone.

Embodiment O

A process for the manufacture of ethylene polymers and copolymers comprising: a) introducing a heated monomer mixture comprising ethylene and optionally, a comonomer into a tubular reactor having at least three reaction zones each having a heating/cooling jacket, said tubular reactor comprising an inner material and an outer material, said outer material being substantially inert in the presence of water under operating conditions.

Embodiment P

A process for the manufacture of ethylene polymers and copolymers comprising: introducing a heated monomer mixture comprising ethylene and optionally a comonomer into a tubular reactor having at least three reaction zones each having a heating/cooling jacket, said tubular reactor comprising an inner material and an outer material, said outer material consisting essential of copper.

Embodiment Q

The process of Embodiment O or P, wherein the outer material comprises copper, particularly wherein the copper comprises at least one of oxygen-free electronic copper (C10100); oxygen-free copper without residual deoxidants (C10200); oxygen-free, extra low phosphorus copper (C10300); oxygen-free, low phosphorus copper (C10800); phosphorus deoxidized, low residual phosphorus copper (C12000); or phosphorus deoxidized, high residual phosphorus copper (C12200).

Embodiment R

The process of any of Embodiments O to Q, wherein the copper is a phosphorus deoxidized, high residual phosphorus copper (C12200), particularly having a phosphorous content of 0.005 to 0.050 wt. %, preferably 0.01 to 0.030 wt. %, more preferably 0.015 to 0.025 wt. %.

Embodiment S

The process of any of Embodiments O to R, wherein the inner material comprises steel, preferably low-alloy carbon steel according to ASTM A723.

Embodiment T

The process of any of Embodiments O to S, wherein the inner material is a steel having one or more of the following features: a carbon content ≤0.40 wt. %, preferably ≤0.35 wt. %; a manganese content ≤0.90 wt. %; a phosphorus content ≤0.015 wt. %; a sulfur content ≤0.015 wt. %; a silicon content ≤0.35 wt. %; a nickel content of 1.5 to 2.25 wt. %, 2.3 to 3.3 wt. %, or 3.3 to 4.5 wt. %; a chromium content of 0.80 to 2.00 wt. %; a molybdenum content of 0.20 to 0.40 wt. %, 0.30 to 0.50 wt. %, or 0.40 to 0.80 wt. %; and/or a vanadium content ≤0.20 wt. %.

Embodiment U

The process of any of Embodiments O to T, wherein ratio of the thickness of the inner material to the thickness of the outer material is about 5.0 to about 50.0, preferably about 7.5 to about 35.0, or about 10.0 to about 30.0.

Embodiment V

The process of any of Embodiments O to U, wherein the inner material has a thickness of about 10.0 to about 100.0 mm, preferably about 15.0 to about 50.0 mm, and the outer material has a thickness of about 0.50 mm to about 10.0 mm, particularly 1.0 mm to about 5.0 mm.

Embodiment W

The process of any of Embodiments O to V, further comprising: b) compressing monomer mixture comprising ethylene and optionally a comonomer, to a first pressure in a primary compressor; c) mixing the monomer mixture with recycled ethylene and further compressing the monomer mixture to a second pressure in a secondary compressor.

Embodiment X

The process of any of Embodiments O to W, further comprising: d) heating at least a portion of the compressed monomer mixture to a temperature of at least 95° C.

Embodiment Y

The process of any of Embodiments O to X, further comprising: e) introducing one or more initiators into the tubular reactor at the least three reaction zones; allowing the monomer mixture to polymerize to form a reaction mixture, and cooling the reaction mixture in at least the first two reaction zones.

Embodiment Z

The process of any of Embodiments O to Y, further comprising: f) releasing the reaction mixture through a high-pressure let-down valve; cooling the released reaction mixture; and separating the released reaction mixture in a product separator into polymer and unreacted ethylene, and recycling unreacted ethylene.

Embodiment AA

The process of any of Embodiments O to Y, further comprising: maintaining a pressure drop over the length of the tubular reactor such as to maintain a flow velocity in the tubular reactor of at least 6 m/s.

Embodiment AB

The process of any of Embodiments O to AA, wherein the process converts least 28% of the monomer mixture to the ethylene polymer or copolymer.

Although the present invention has been described in considerable detail with reference to certain aspects and embodiments thereof, other aspects and embodiments are possible. Therefore, the spirit and scope of the appended claims should not be limited to the description of the embodiments contained herein. Certain features of the present invention are described in terms of a set of numerical upper limits and a set of numerical lower limits. It should be appreciated that ranges from any lower limit to any upper limit are within the scope of the invention unless otherwise indicated.

All patents, test procedures, and other documents cited in this application are fully incorporated herein by reference for all jurisdictions in which such incorporation is permitted.

What is claimed is:

1. An apparatus for the manufacture of polyethylene and polyethylene copolymers comprising a tubular reactor, the tubular reactor including one or more reaction zones having a heating/cooling jacket, said tubular reactor comprising an inner material and an outer material, said outer material being substantially inert in the presence of water under operating conditions; wherein the outer material comprises copper and the copper comprises at least one of oxygen-free electronic copper (C10100); oxygen-free copper without residual deoxidants (C10200); oxygen-free, extra low phosphorus copper (C10300); oxygen-free, low phosphorus copper (C10800); phosphorus deoxidized, low residual phosphorus copper (C12000); or phosphorus deoxidized, high residual phosphorus copper (C12200).

2. The apparatus of claim 1, wherein the copper has a phosphorous content of 0.005 to 0.050 wt. %.

3. The apparatus of claim 1, wherein the inner material comprises steel according to ASTM A723.

4. The apparatus of claim 1, wherein the inner material is a steel having one or more of the following features:
   a) a carbon content ≤0.40 wt. %;
   b) a manganese content ≤0.90 wt. %;
   c) a phosphorus content ≤0.015 wt. %;
   d) a sulfur content ≤0.015 wt. %;
   e) a silicon content ≤0.35 wt. %;
   f) a nickel content of ≤5.00 wt. %;
   g) a chromium content of 0.80 to 2.00 wt. %;
   h) a molybdenum content of ≤0.80 wt. %; and/or
   i) a vanadium content ≤0.20 wt. %.

5. The apparatus of claim 1, wherein ratio of the thickness of the inner material to the thickness of the outer material is about 5.0:1 to about 50.0:1.

6. The apparatus of claim 1, wherein the inner material has a thickness of about 10.0 mm to about 100.0 mm and the outer material has a thickness of about 0.50 mm to about 10.0 mm.

7. The apparatus of claim 1, further including a primary compressor, optionally in fluid communication with a two-stage secondary compressor, wherein at least one of the primary and secondary compressors is in fluid communication with a heated conduit in fluid communication with the tubular reactor.

8. The apparatus of claim 7, wherein the primary compressor and/or the two-stage secondary compressor contact(s) ethylene to produce compressed ethylene and wherein the heated conduit includes heating means to enable at least a portion of the compressed ethylene to be heated to at least 95° C.

9. The apparatus of claim 1, wherein the tubular reactor is in fluid communication with a product separator.

10. The apparatus of claim 7, wherein the apparatus includes the secondary compressor, and further comprises at least one conduit for the transfer of recycled ethylene from a product separator to the secondary compressor.

11. The apparatus of claim 7, wherein the apparatus includes the secondary compressor and the secondary compressor communicates via one or more additional conduits with one or more points downstream of a front end of the tubular reactor to supply of one or more ethylene sidestreams to the tubular reactor.

12. The apparatus of claim 1, wherein the tubular reactor comprises at least three inlets for injection of initiator, thereby defining at least three reaction zones and being provided with a heating/cooling jacket in each reaction zone.

13. A process for the manufacture of ethylene polymers and copolymers comprising:
   a) introducing a heated monomer mixture comprising ethylene and optionally a comonomer into a tubular reactor having at least three reaction zones each having a heating/cooling jacket, said tubular reactor comprising an inner material and an outer material, said outer material being substantially inert in the presence of water under operating conditions.

14. The process of claim 13, wherein the outer material comprises copper.

15. The process of claim 14, wherein the copper comprises at least one of oxygen-free electronic copper (C10100); oxygen-free copper without residual deoxidants (C10200); oxygen-free, extra low phosphorus copper (C10300); oxygen-free, low phosphorus copper (C10800); phosphorus deoxidized, low residual phosphorus copper (C12000); or phosphorus deoxidized, high residual phosphorus copper (C12200).

16. The process of claim 14, wherein the copper has a phosphorous content of 0.005 to 0.050 wt. %.

17. The process of claim 13, wherein the inner material comprises steel according to ASTM A723.

18. The process of claim 13, wherein the inner material is a steel having one or more of the following features:
   a) a carbon content ≤0.40 wt. %;
   b) a manganese content ≤0.90 wt. %;
   c) a phosphorus content ≤0.015 wt. %;
   d) a sulfur content ≤0.015 wt. %;
   e) a silicon content ≤0.35 wt. %;
   f) a nickel content of 1.5 to 2.25 wt. %, 2.3 to 3.3 wt. %, or 3.3 to 4.5 wt. %;
   g) a chromium content of 0.80 to 2.00 wt. %;
   h) a molybdenum content of 0.20 to 0.40 wt. %, 0.30 to 0.50 wt. %, or 0.40 to 0.80 wt. %; and/or
   i) a vanadium content ≤0.20 wt. %.

19. The process of claim 13, wherein ratio of the thickness of the inner material to the thickness of the outer material is about 5 to about 50.

20. The process of claim 13, wherein the inner material has a thickness of about 10.0 mm to about 100.0 mm and the outer material has a thickness of about 0.50 mm to about 10.0 mm.

21. The process of claim 13, further comprising: b) compressing the monomer mixture comprising ethylene and optionally a comonomer, to a first pressure in a primary compressor; and c) optionally mixing the monomer mixture with recycled ethylene and further compressing the monomer mixture to a second pressure in a secondary compressor.

22. A process for the manufacture of ethylene polymers and copolymers comprising: introducing a heated monomer mixture comprising ethylene and optionally a comonomer into a tubular reactor having at least three reaction zones, each having a heating/cooling jacket, said tubular reactor comprising an inner material and an outer material, and said outer material consisting essentially of copper.

* * * * *